Jan. 20, 1959     K. EICHWEBER     2,869,932
DETACHABLE ROAD PROTECTING DEVICE FOR TRACTORS, TRACKLAYING
VEHICLES AND THE LIKE
Filed April 29, 1954     2 Sheets-Sheet 1
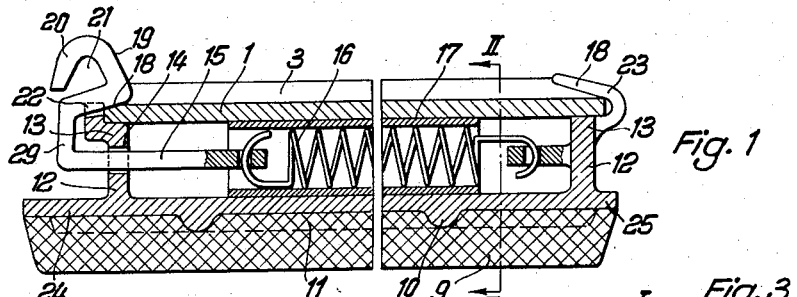
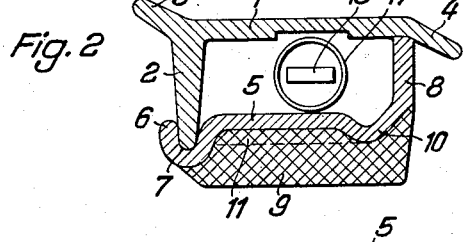
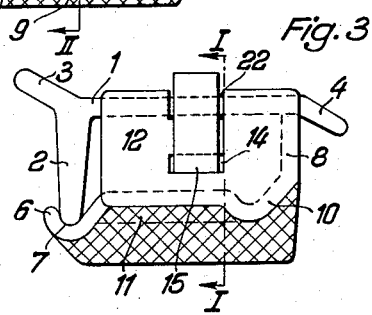
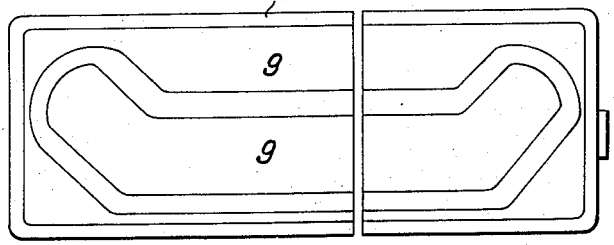
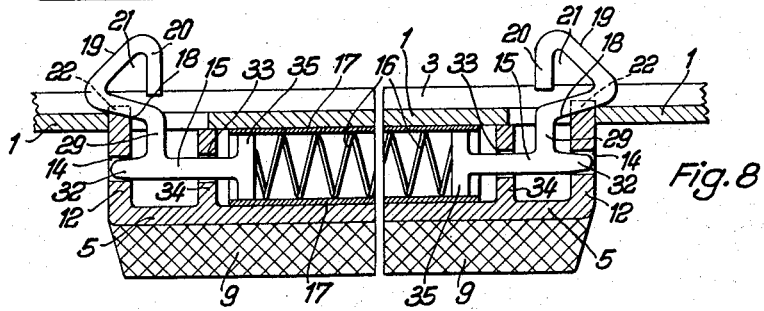
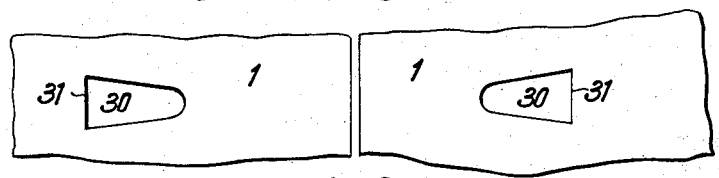
Inventor:
KURT EICHWEBER
BY:

Jan. 20, 1959 K. EICHWEBER 2,869,932
DETACHABLE ROAD PROTECTING DEVICE FOR TRACTORS, TRACKLAYING
VEHICLES AND THE LIKE
Filed April 29, 1954 2 Sheets-Sheet 2
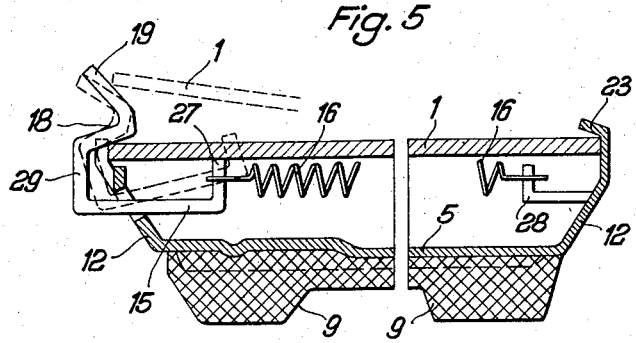
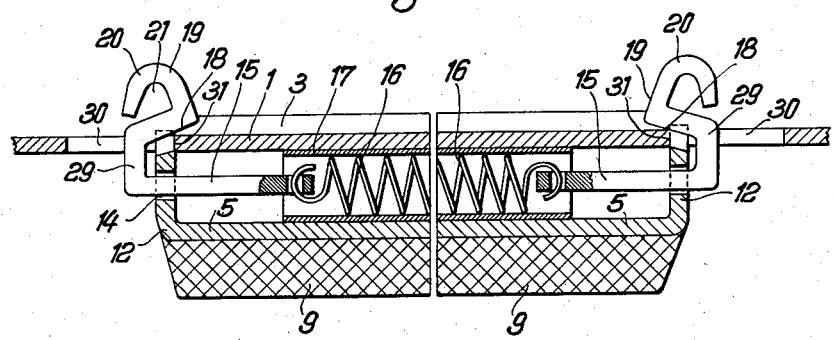
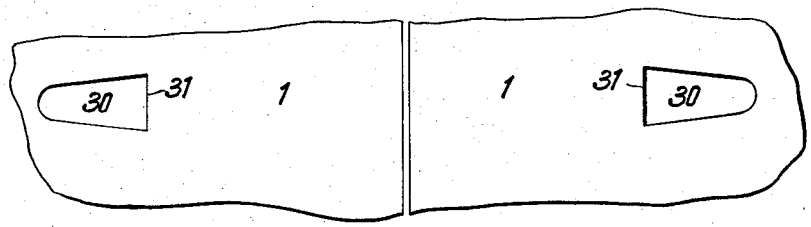
Inventor:
KURT EICHWEBER
BY:

United States Patent Office 2,869,932
Patented Jan. 20, 1959

2,869,932

DETACHABLE ROAD PROTECTING DEVICE FOR TRACTORS, TRACKLAYING VEHICLES AND THE LIKE

Kurt Eichweber, Hamburg-Niendorf, Germany

Application April 29, 1954, Serial No. 426,462

Claims priority, application Germany May 13, 1953

5 Claims. (Cl. 305—10)

The present invention relates to a detachable road protecting device for plate-like gripper links with transverse gripper flanges at their forward end of endless tracks, and has for its object improvements for better preventing the shifting of the device on the gripper links of such vehicles as well as for using spring actuated locking means.

Known devices of this kind are usually so constructed that their immovable seat on the gripper links can not be relied upon, or their construction is too complicated to permit an easy manipulation of the device, so that the requirement of quick and easy attachment to and detachment from, as well as a firm and reliable seat of the device on the gripper links, is not fulfilled by them.

The object of the invention is to overcome the deficiencies of known constructions, and to provide a road protecting device of this type which with simplest means fulfills the requirements of practical use and thereby facilitates and widens the range of application of the device.

In order to accomplish this object, the invention provides the detachable road protecting device, in combination with each plate-like gripper link of the endless track with transverse gripper flange at the forward end with coupling edge portions at both lateral sides parallel to the longitudinal centre line of said gripper link, a detachable plate-like bed part for said gripper link adapted to cover at least partly the underside of the gripper link facing the road, an elongated transverse recess at the forward end of said bed part suitably dimensioned and adapted to embrace said forward gripper flange of the gripper link to avoid displacement of said bed part in longitudinal direction of said endless track, a supporting flange at the rear end of said bed part opposite the gripper link, a pair of oppositely disposed lateral flanges at the lateral sides of said bed part adapted to rest against said lateral coupling edge portions of the gripper link to avoid lateral displacement of said bed part in opposite lateral directions of said endless track, hook-shaped locking means at said opposite lateral flanges of the bed part for engagement in wedge-like fashion behind said lateral coupling edge portions of said gripper link on both lateral sides, at least one of said hook-shaped locking means being movably disposed and guided in the respective lateral flange in lateral direction, and a spring positioned in said bed part adapted to actuate said movable hook-shaped locking means for detachably securing said bed part in its position on said gripper link.

Additional features and advantages of the invention will be understood from a consideration of the following detailed description taken in connection with the accompanying drawings, forming a part of this specification and in which several embodiments of the invention have been shown by way of illustration. However, I wish to say that the invention is not confined to any strict conformity with the showing of the drawings, but may be changed or modified, so long as such changes or modifications mark no material departure from the salient features of the invention as expressed in the appended claims.

In the drawings, in which like or identical parts are referred to by the same reference numerals, in all of the several figures, Fig. 1 is a vertical sectional view on line I—I of Fig. 3, showing a gripper link of an endless track and its appertaining detachable road protecting device or cover part;

Fig. 2 is a vertical sectional view on line II—II of Fig. 1;

Fig. 3 is a side view of the construction of Fig. 1;

Fig. 4 is a view of the underside of the cover part provided with an elastic noise-damping cushion;

Fig. 5 is a vertical sectional view similar to that of Fig. 1 of a modified form of construction;

Fig. 6 is a vertical sectional view similar to that of Fig. 1 of another modified form of construction provided with movable spring-pulled locking hooks fastened to a gripper link of specially large width;

Fig. 7 is a fractional top view of the plate of the gripper link of Fig. 6 provided with coupling openings for the lateral flanges and the hook-shaped portions of the locking hooks to extend through;

Fig. 8 is a vertical sectional view similar to that of Fig. 6 of a modified form of construction provided with a pair of oppositely disposed locking hooks adapted to effect the locking action through spring-actuated movement in outward direction;

Fig. 9 is a fractional top view of the plate of the gripper link of Fig. 8 provided with openings for the lateral flanges and the hook-shaped portions of the locking hooks to extend through.

Referring now to the drawings in detail, the reference numeral 1 (in Figs. 1 to 4) designates the plate-like gripper link of the endless track of a crosscountry tractor or the like. The gripper link 1 has its transversely extending forward end portion 3 slightly upwardly bent away from the roadway or ground, and is provided on the forward end of its underside near its end portion 3 with a gripper flange 2 extending transversely of the direction in which the tractor is moving, while its transversely extending rear end portion 4 is downwardly bent at an angle toward the roadway. The plate-like cover part or bed part 5 embraces with its transversely extending downwardly curved portion 6, 7 the transversely extending flange 2 and rests at its transversely extending opposite rear end with its upwardly bent portion 8 against the transversely extending rear portion 4 of the gripper link 1. On the side facing the road the bed part 5 is provided with a non-metallic elastic supporting cushion 9 of rubber or some other suitable material which is securely fastened to the bed part 5. If rubber is used as supporting cushion it is preferably secured to the bed part 5 through vulcanizing.

The bed part 5 is provided for its stability and for the immovable seating of the elastic supporting cushion 9 on its undersurface with a downwardly curved projecting portion 10 extending parallel to the curved portion 6, 7 at the opposite end of the bed part 5, and, furthermore, with a plurality of ribs or downwardly curved portions 11 extending transversely of the direction of the curved portion 10 and projecting likewise into the mass of the elastic supporting- and noise-dampening cushion 9.

The bed part 5 is further provided at or near its lateral ends with a pair of upwardly projecting flanges 12 which with their cranked ends 13 simultaneously rest against the underside of the gripper link and against the lateral edges of the gripper link 1 to thereby prevent lateral displacement of the bed part 5 with respect to the gripper link 1. One of the lateral flanges 12 is provided with an opening 14 for the extension therethrough and the guidance therein of the movable hook-shaped holding or locking hook 15 which by means of a spring 16 is resiliently secured in locking position. The spring 16 may be guided in a tubular casing 17 which is rigidly secured to an inner surface of the bed part 5 (see Fig. 2). The hook-shaped outer end of the locking hook 15 has a tightening surface or locking surface 18 which extends in inwardly ascending direction toward the gripper link 1 and which engages behind the gripper link 1. At the upper end of the locking surface 18 the hook-shaped end changes into a backwardly curved guide portion 19 by means of which it is enabled to slip past the lateral edge of the gripper link 1 when the locking surface 18 of the hook-shaped end is to be pushed behind the gripper link 1 (see Fig. 1). The backwardly curved guide portion 19 of the hook-shaped end of the locking hook 15 may be provided with an extension 20 bent toward the portion 29 of the hook-shaped end in such a way that thereby a loop 21 is formed which serves as a handle for the hook-shaped end when the bed part 5 is to be fastened to or to be removed from the gripper link 1. The flanges 12 are provided in their upper edges with recesses 22 adapted in width to the width of the hook-shaped ends of the locking hooks 15 for the guidance of the hook-shaped ends in said recesses (see Fig. 3). One of the lateral flanges 12 of the bed part 5 is provided in the embodiment illustrated in Fig. 1 with a locking hook 23 which is rigidly secured to the flange 12 and which likewise engages by means of an ascending surface portion 18 behind the lateral edge of the gripper link 1. The locking hook 23 may be so dimensioned that it extends either across the entire length of the lateral flange 12 or only across a portion of the latter. The bed part 5 may be provided at its lateral ends with extensions 24, 25 of such length that the locking hooks 15 are thereby secured against damaging or the accumulation of dirt. The elastic supporting cushion 9 may extend across the entire width of the bed part 5 or only across a portion of the latter. The rubber cushion 9 may preferably be of profiled formation on the side facing the roadway, as illustrated in Fig. 4.

The hook-shaped end of the locking hook 15 rests against the lower edge of the recess 22 only when the hook-shaped end has been removed from behind the gripper link 1 and is pulled in inward direction by the action of the spring 16.

In the modification of Fig. 5 the lateral flanges 12 of the bed part 5 are inclined toward the supporting surface of the bed part 5 for the rubber cushion 9, so that the rubber cushion is of smaller width. The lateral flange 12 provided with the rigid locking hook 23 has no supporting rim 13. The locking hook 15 is preferably produced from flat material and again provided with the wedge-like ascending locking surface 18 and the guide edge 19. In addition to this, the locking hook 15 is provided at its spring-pulled end with a stop and guide flange 27 to which one end of the spring 16 is attached, and which, when the locking hook is in locking position, rests against the plate 1 of the gripper link and reliably secures in cooperation with the spring 16 the locking hook in its locking position. The stop and guide flange 27 extends in a direction transverse to the longitudinal direction of the locking hook 15 and may be of larger width than the width of the locking hook 15. The spring 16 is at its opposite end secured to an arm 28 which is fastened to the adjacent lateral flange 12 of the bed part 5.

For fastening the bed part 5 to the gripper link 1 it is first necessary to place the rigid locking hook 23 behind one of the lateral edges of the gripper link 1, whereupon the movable locking hook 15 of the bed part 5 is pushed with the aid of the guide surface 19 onto the opposite lateral edge of the gripper link 1. During this fastening operation, the locking hook 15 takes up at first an inclined position, as indicated in broken lines in Fig. 6, until the stop flange 27 hits against the downward moving plate 1 of the gripper link and is formed back by the latter. During the downward movement of the plate 1 the locking hook 15 is first slightly displaced in outward direction, and then jerked back by the action of the spring 16 into locking position, in which the locking surface 18 engages behind the plate 1 of the gripper link.

In order to facilitate the fastening of the bed part 5 to the gripper link 1, the inclined or curved guide surface 19 of the locking hook 15 is at its lower end bent in such a way that between it and the wedge-like locking surface 18 an enlarged angle is formed. It is further advisable to provide the lateral flange 12 of the bed part 5 with a lateral stop surface for the portion 29 of the locking hook 15 to rest against when the locking hook 15 is not in locking position. The fastening place of the spring 16 at the stop and guide flange 27 is preferably so selected that the continuation of the center line of the spring 16 extends through said fastening place and through the center of the lateral stop surface for the locking hook 15.

In the modification illustrated in Fig. 6, the bed part 5 is provided with two oppositely disposed hook-shaped locking members 15. The plate 1 of the gripper link is in this case of larger width and provided with the openings 30 suitably dimensioned for the hook-shaped ends of the locking hooks 15 to be pushed through and having their inner edges (seen from the longitudinal center line of the gripper link) 31 adapted to serve as shoulders for the lateral flanges 12 to rest against and as locking edges for the locking hooks 15 (see Fig. 7). Here, the lateral flanges 12 are not cranked at their ends, and merely rest against the inner edges 31 of the openings 30 of the plate 1 of the gripper link. The locking hooks 15 are of uniform formation and are secured in locking position by means of a common tension spring 16 guided in a tubular casing 17 which is rigidly fastened to the bed part 5. If the ends of the locking hooks are provided with stop- and guide flanges 27 (as shown in Fig. 5), the guide casing 17 can be omitted, as in the latter case the locking hooks 15 are guided already by the stop and guide flanges 27 in their locking position at the plate 1 of the gripper link. The stop surface for the portion 29 of the locking hook is then provided at both of the lateral flanges 12 for both of the movable locking hooks 15. Constructions like this, provided with two oppositely disposed locking hooks 15, may be used on vehicles where at the gripper chain links or gripper wheels sufficient space is available for their arrangement. In cases of this kind in which the gripper links are of specially large width, it is of course also possible to employ the forms of construction illustrated in Figs. 1 to 5.

In the form of construction shown in Fig. 8, the bed part 5 is provided with a pair of oppositely disposed locking hooks 15 adapted to effect the locking action through movement in outward direction. The tightening or locking edges 18 of the locking hooks ascend in outward direction, while the guide surfaces 19 ascend in inward direction. The locking hooks 15 are guided, by means of the transversely extending portions of their stems in the guide openings 33 provided in the flanges 34, by means of the extensions 32 of the transversely extending stem-portions in the guide openings 14 in the lateral flanges 12, and by means of the flanges 35 at the inner ends of the stems in the tubular casing 17, and resiliently forced in outward direction into locking engagement by means of the pressure exerted by the compression spring 16 against the flanges 35. In addition to this, the hook-shaped portions of the locking hooks 15 are guided in recesses 22 of the lateral flanges 12. The portions 29 of the locking hooks 15 rest in their outermost position against adjacent surface portions of the lateral flanges 12. In a construction like this the plate 1 of the gripper link is provided with openings 30 having their holding or locking edge 31 positioned at the outer end (seen from the longitudinal center line of the gripper link) 31 of the openings 30, as illustrated in Fig. 9.

Instead of the guide casing 17, or in addition to the latter, the bed part 5 may also be provided with guide casings or guide flanges for the straight-lined stems of the locking hooks 15. The locking hooks 15 may be of T-, I-, U-shaped or any other suitable cross-section. If the bed parts 5 are to be used on wheels provided with grippers or the like, they have to be given a correspondingly curved shape, and have to be fastened, in case of radially extending continuous gripper fellies, at spaced distances from one another on these gripper fellies.

What I claim as new and desire to secure by Letters Patent of the United States is:

1. A detachable road protecting device for endless track gripper links, said gripper links having transverse gripper flanges, said endless track links having side edges parallel to the longitudinal center line of said link, a detachable hollow box-like bed part on each gripper link, and attachment means for securing said gripper link to said box-like bed part; comprising, in combination, a transverse groove on said bed part for receiving said transverse gripper flange, a transverse supporting flange parallel to said transverse groove on said bed part for abutting said gripper link, a pair of opposed lateral flanges on said bed part for abutting the side edges of said gripper links, opposed lateral hook-shaped locking members on said lateral flanges extending in a transverse direction and each having an inclined lock portion outside of said bed part and ascending towards its free end for wedge-like engagement with the side edge of said gripper link, at least one of said hook-shaped locking members being movable and having a spring-loaded inner part within said bed part, one of said flanges having a guide opening for receiving and guiding said movable locking member, said movable locking member having an elongated portion on its free end and connected to said inclined lock portion and ascending in a direction substantially perpendicular thereto for initially engaging said gripper link whereby when said road protecting device is pressed against said gripper link, said movable locking member is caused to laterally shift to provide entry of said side edges into said movable locking member and thereby to be engaged in a wedge-like manner.

2. A detachable road protecting device as in claim 1 and wherein the flange having said guide opening is provided with a guide slot above said guide opening for guiding the inclined lock portion of said movable locking member to prevent pivotal movement thereof.

3. A detachable road protecting device as in claim 2 and having a tubular casing in said bed part supporting and guiding the spring of said spring loaded-inner part.

4. A detachable road protecting device as in claim 1 and having said movable locking member pivoted in said guide opening in a transverse plane.

5. A detachable road protecting device as in claim 1 and wherein said bed part has an internal guide flange parallel to said opposed lateral flanges and having a guide opening cooperating with the guide opening in said one lateral flange, said one lateral flange having a guide slot for the inclined lock portion of said movable locking member, whereby said guide openings and said guide slot cooperate to prevent side and pivotal movement of said locking member.

References Cited in the file of this patent

UNITED STATES PATENTS

| | | |
|---|---|---|
| 1,568,090 | Saives | Jan. 5, 1926 |
| 2,028,346 | Panzegrau | Jan. 21, 1936 |
| 2,129,557 | Beach | Sept. 6, 1938 |
| 2,161,486 | Rider | June 6, 1939 |
| 2,686,697 | Baker | Aug. 17, 1954 |

FOREIGN PATENTS

| | | |
|---|---|---|
| 432,330 | Great Britain | July 24, 1935 |
| 968,280 | France | Apr. 12, 1950 |